United States Patent
Dessouki et al.

(10) Patent No.: US 7,975,750 B2
(45) Date of Patent: Jul. 12, 2011

(54) COULOMB FRICTION DAMPED DISC BRAKE ROTORS

(75) Inventors: Omar S. Dessouki, Beverly Hills, MI (US); Brent D. Lowe, Milford, MI (US); Mark T. Riefe, Brighton, MI (US); Matthew T. Doescher, Berkley, MI (US); Anil K. Sachdev, Rochester Hills, MI (US); Mark W. Verbrugge, Troy, MI (US); James G. Schroth, Troy, MI (US); Michael D. Hanna, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1018 days.

(21) Appl. No.: 10/961,813

(22) Filed: Oct. 8, 2004

(65) Prior Publication Data

US 2006/0076200 A1    Apr. 13, 2006

(51) Int. Cl.
*B22D 19/00* (2006.01)
*B22D 19/12* (2006.01)
*F16D 65/12* (2006.01)

(52) U.S. Cl. .................. 164/100; 164/98; 188/218 XL
(58) Field of Classification Search ............ 164/98–102; 188/218 XL
See application file for complete search history.

(56) References Cited

U.S. PATENT DOCUMENTS

| | | | |
|---|---|---|---|
| 0,974,024 A | 10/1910 | Carter | |
| 1,484,421 A | 2/1924 | Thomspon | |
| 1,989,211 A | 1/1935 | Norton | |
| 2,012,838 A | 8/1935 | Tilden | |
| 2,026,878 A | 1/1936 | Farr | |
| 2,288,438 A | 6/1942 | Dach | |
| 2,603,316 A | 7/1952 | Pierce | |
| 2,978,793 A | 4/1961 | Lamson et al. | |
| 3,085,391 A | 4/1963 | Hatfield et al. | |
| 3,127,959 A | 4/1964 | Wengrowski | |
| 3,147,828 A | 9/1964 | Hunsaker | |
| 3,292,746 A | 12/1966 | Robinette | 188/218 |
| 3,378,115 A | 4/1968 | Stephens, III | |
| 3,425,523 A | 2/1969 | Robinette | 188/218 |
| 3,509,973 A | 5/1970 | Kimata | |
| 3,575,270 A | 4/1971 | Wagenfuhrer et al. | |
| 3,774,472 A | 11/1973 | Mitchell | |

(Continued)

FOREIGN PATENT DOCUMENTS

CH    428319 A    1/1967

(Continued)

OTHER PUBLICATIONS

Disc Brake Squeal: Diagnosis and Prevention, SAE publication 03NVC-224, O. Dessouki, G. Drake, B. Lowe, and W.K. Channg. 7 pages, dated 2002.

(Continued)

*Primary Examiner* — Kuang Lin
(74) *Attorney, Agent, or Firm* — Reising Ethington P.C.

(57) ABSTRACT

A Coulomb friction damped disc brake rotor, wherein damping is provided Coulomb friction in generally coextensive relation with the braking surfaces of the one or more rotor cheeks. The Coulomb friction damped disc brake rotor has at least one interfacial boundary formed in at least one rotor cheek disposed in generally coextensive relation to the braking surface thereof. The interfacial boundary provides a mechanically distinguishable surface boundary between two surfaces which are in mutual contact such that a state of Coulomb friction exists therebetween.

14 Claims, 13 Drawing Sheets

U.S. PATENT DOCUMENTS

| | | | |
|---|---|---|---|
| 3,841,448 A | 10/1974 | Norton, Jr. | |
| 3,975,894 A | 8/1976 | Suzuki | |
| 4,049,085 A | 9/1977 | Blunier | |
| 4,072,219 A | 2/1978 | Hahm et al. | |
| 4,195,713 A | 4/1980 | Hagbjer et al. | |
| 4,250,950 A | 2/1981 | Buxmann et al. | |
| 4,278,153 A | 7/1981 | Venkatu | |
| 4,281,745 A | 8/1981 | Wirth | |
| 4,338,758 A | 7/1982 | Hagbjer | |
| 4,379,501 A | 4/1983 | Hagiwara et al. | |
| 4,475,634 A | 10/1984 | Flaim et al. | |
| 4,523,666 A | 6/1985 | Murray | 188/218 |
| 4,529,079 A | 7/1985 | Albertson | |
| 4,905,299 A | 2/1990 | Ferraiuolo et al. | |
| 5,004,078 A * | 4/1991 | Oono et al. | 188/218 A |
| 5,005,676 A | 4/1991 | Gassiat | |
| 5,025,547 A | 6/1991 | Sheu et al. | |
| 5,083,643 A | 1/1992 | Hummel et al. | |
| 5,115,891 A | 5/1992 | Raitzer et al. | |
| 5,139,117 A | 8/1992 | Melinat | 188/264 |
| 5,143,184 A | 9/1992 | Snyder et al. | 188/218 |
| 5,183,632 A | 2/1993 | Kluchi et al. | |
| 5,184,662 A | 2/1993 | Quick et al. | |
| 5,259,486 A | 11/1993 | Deane | |
| 5,310,025 A | 5/1994 | Anderson | |
| 5,416,962 A | 5/1995 | Passarella | 29/173 |
| 5,417,313 A | 5/1995 | Matsuzaki et al. | 188/264 |
| 5,509,510 A * | 4/1996 | Ihm | 188/218 XL |
| 5,530,213 A | 6/1996 | Hartsock et al. | |
| 5,582,231 A | 12/1996 | Siak et al. | |
| 5,620,042 A | 4/1997 | Ihm | |
| 5,660,251 A | 8/1997 | Nishizawa et al. | |
| 5,789,066 A | 8/1998 | DeMare et al. | |
| 5,819,882 A * | 10/1998 | Reynolds et al. | 188/71.5 |
| 5,855,257 A * | 1/1999 | Wickert et al. | 188/218 XL |
| 5,862,892 A | 1/1999 | Conley | |
| 5,878,843 A * | 3/1999 | Saum | 188/218 XL |
| 5,927,447 A | 7/1999 | Dickerson | |
| 5,965,249 A | 10/1999 | Sutton et al. | |
| 6,047,794 A | 4/2000 | Nishizawa | |
| 6,073,735 A | 6/2000 | Botsch et al. | |
| 6,112,865 A | 9/2000 | Wickert et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,231,456 B1 | 5/2001 | Rennie et al. | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | 188/218 XL |
| 6,357,557 B1 | 3/2002 | DiPonio | |
| 6,367,598 B1 | 4/2002 | Sporzynski | |
| 6,405,839 B1 | 6/2002 | Ballinger et al. | |
| 6,465,110 B1 | 10/2002 | Boss et al. | |
| 6,481,545 B1 | 11/2002 | Yano et al. | |
| 6,505,716 B1 | 1/2003 | Daudi et al. | 188/250 |
| 6,507,716 B2 | 1/2003 | Nomura et al. | 399/80 |
| 6,543,518 B1 | 4/2003 | Bend et al. | |
| 6,648,055 B1 | 11/2003 | Haug et al. | |
| 6,799,664 B1 | 10/2004 | Connolly | |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 6,945,309 B2 | 9/2005 | Frait et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,219,777 B2 | 5/2007 | Lin | |
| 7,293,755 B2 | 11/2007 | Miyahara et al. | |
| 7,380,645 B1 | 6/2008 | Ruiz | |
| 7,568,560 B2 | 8/2009 | Lin | |
| 7,594,568 B2 | 9/2009 | Hanna et al. | |
| 7,604,098 B2 | 10/2009 | Dessouki et al. | |
| 7,644,750 B2 | 1/2010 | Schroth et al. | |
| 7,775,332 B2 | 8/2010 | Hanna et al. | |
| 7,836,938 B2 | 11/2010 | Agarwal et al. | |
| 2002/0007928 A1 * | 1/2002 | Guetlbauer et al. | 164/98 |
| 2002/0084156 A1 | 7/2002 | Ballinger et al. | |
| 2002/0104721 A1 | 8/2002 | Schaus et al. | |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | 188/218 |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | 164/132 |
| 2005/0150222 A1 | 7/2005 | Kalish et al. | |
| 2005/0183909 A1 | 8/2005 | Rau et al. | 188/218 XL |
| 2005/0193976 A1 | 9/2005 | Suzuki et al. | |
| 2006/0076200 A1 | 4/2006 | Dessouki et al. | 188/218 |
| 2006/0243547 A1 | 11/2006 | Keller | |
| 2007/0039710 A1 | 2/2007 | Newcomb | |
| 2007/0056815 A1 | 3/2007 | Hanna et al. | |
| 2007/0062664 A1 | 3/2007 | Schroth et al. | |
| 2007/0062768 A1 | 3/2007 | Hanna et al. | |
| 2007/0119667 A1 | 5/2007 | Hanna et al. | |
| 2007/0142149 A1 | 6/2007 | Kleber | |
| 2007/0166425 A1 | 7/2007 | Utsugi | |
| 2007/0235270 A1 | 10/2007 | Miskinis et al. | |
| 2007/0298275 A1 | 12/2007 | Carter et al. | |
| 2008/0099289 A1 | 5/2008 | Hanna et al. | |
| 2008/0185249 A1 | 8/2008 | Schroth et al. | |
| 2009/0032569 A1 | 2/2009 | Sachdev et al. | |
| 2009/0056134 A1 | 3/2009 | Kleber et al. | |
| 2009/0107787 A1 | 4/2009 | Walker et al. | |

FOREIGN PATENT DOCUMENTS

| | | |
|---|---|---|
| CN | 2005/10113784.X | 10/2005 |
| CN | 20051113784 A | 10/2005 |
| CN | 1757948 A | 4/2006 |
| CN | 2863313 Y | 1/2007 |
| DE | 24 46 938 | 4/1976 |
| DE | 2446938 A1 | 4/1976 |
| DE | 25 37 038 | 3/1977 |
| DE | 2537038 A1 | 3/1977 |
| DE | 19649919 A1 | 6/1998 |
| DE | 199 48 009 | 3/2001 |
| DE | 19948009 C1 | 3/2001 |
| DE | 60000008 T2 | 3/2002 |
| DE | 101 41 698 | 3/2003 |
| DE | 10141698 A1 | 3/2003 |
| DE | 102005048258.9 | 10/2005 |
| DE | 102005048258 A1 | 4/2006 |
| DE | 60116780 T2 | 11/2006 |
| EP | 0 205 713 | 12/1986 |
| EP | 0205713 A1 | 12/1986 |
| GB | 1230 274 | 4/1971 |
| GB | 1230274 | 4/1971 |
| GB | 2 328 952 | 3/1999 |
| JP | 54052576 U | 4/1979 |
| JP | 57154533 | 9/1982 |
| JP | 57154533 A | 9/1982 |
| JP | 1126434 U1 | 8/1989 |
| JP | 05-104567 | 4/1993 |
| JP | 11342461 A | 12/1999 |
| JP | 2001512763 T | 8/2001 |
| JP | 2003214465 A | 7/2003 |
| JP | 2004011841 A | 1/2004 |
| KR | 20010049837 A | 6/2001 |
| WO | 9823877 A1 | 6/1998 |
| WO | WO 98/23877 | 6/1998 |
| WO | 0136836 A1 | 5/2001 |
| WO | WO 01/36836 | 5/2001 |
| WO | 2007035206 A2 | 3/2007 |

OTHER PUBLICATIONS

Z. Wu, C. Richter, L. Menon, A Study of Anodization Process During Pore Formation in Nanoporous Alumina Templates, Journal of the Electrochemical Society, vol. 154, 2007.

W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-B505.

I.V. Sieber, P. Schmuki, Porous Tantalum Oxide Prepared by Electrochemical Anodic Oxidation, Journal of the Electrochemical Society, vol. 152, 2005, pp. C639-C644.

H. Tanaka, A. Shimada, A. Kinoshita, In situ Measurement of the Diameter of Nanopores in Silicon During Anodization in Hydrofluoric Acid Solution, Journal of the Electrochemic, 2004.

L.G. Hector, Jr., S. Sheu, Focused Energy Beam Work Roll Surface Texturing Science and Technology, Journal of Materials Processing & Manufacturing Science, vol. 2, Jul. 1993.

P.N. Anyalebechi, Ungrooved Mold Surface Topography Effects on Cast Subsurface Microstructure, Materials Processing Fundamentals, TMS 2007, pp. 49-62.

F. Yigit, Critical Wavelengths for Gap Nucleation in Solidification—Part 1: Theoretical Methodology, Journal of Applied Mechanics, vol. 67, Mar. 2000, pp. 66-76.

P.N. Anyalebechi, Undulatory Solid Shell Growth of Aluminum Alloy 3003 as a Function of the Wavelength of a Grooved Mold Surface Topography, TMS 2007, pp. 31-47.

Hanna et al., U.S. Appl. No. 11/475,756, Bi-metal disc brake rotor and method of manufacturing, filed Jun. 27, 2006.

Schroth et al., U.S. Appl. No. 11/475,759, Method of casting components with inserts for noise reduction, filed Jun. 27, 2006.

Schroth et al., U.S. Appl. No. 12/025,967, Damped products and methods of making and using the same, filed Feb. 5, 2008.

Hanna et al., U.S. Appl. No. 11/440,916, Bi-metal disc brake rotor and method of manufacture, filed May 25, 2006.

Hanna et al., U.S. Appl. No. 11/554,234, Coulomb damped disc brake rotor and method of manufacturing, filed Oct. 30, 2006.

Walker et al., U.S. Appl. No. 11/926,798, Inserts with holes for damped products and methods of making and using the same, filed Oct. 29, 2007.

Hanna et al., U.S. Appl. No. 11/832,401, Damped product with insert and method of making the same, filed Aug. 1, 2007.

Kleber, et al., U.S. Appl. No. 11/848,732, Cast-in-place torsion joint, filed Aug. 31, 2007.

Hanna et al., U.S. Appl. No. 11/780,679, Method of manufacturing a damped part, filed Jul. 20, 2007.

Aase et al., U.S. Appl. No. 11/969,259, Method of forming casting with frictional damping insert, filed Jan. 4, 2008.

Hanna et al., U.S. Appl. No. 12/165,729, Method for securing an insert in the manufacture of a damped part, filed Jul. 1, 2008.

Hanna et al., U.S. Appl. No. 12/165,731, Product with metallic foam and method of manufacturing the same, filed Jul. 1, 2008.

Agarwal et al., U.S. Appl. No. 11/860,049, Insert with tabs and damped products and methods of making the same, filed Sep. 24, 2007.

Hanna et al., U.S. Appl. No. 12/174,163, Damped part, filed Jul. 16, 2008.

Hanna et al., U.S. Appl. No. 12/174,223, Method of casting damped part with insert, filed Jul. 16, 2008.

Hanna et al., U.S. Appl. No. 12/183,180, Casting noise-damped, vented brake rotors with embedded inserts, filed Jul. 31, 2008.

Hanna et al., U.S. Appl. No. 12/183,104, Low mass multi-piece sound damped article, filed Jul. 31, 2008.

Golden et al., U.S. Appl. No. 12/105,411, Insert with filler to dampen vibrating components, filed Apr. 18, 2008.

Hanna et al., U.S. Appl. No. 11/440,893, Rotor assembly and method, filed May 25, 2006.

Carter, U.S. Appl. No. 11/680,179, Damped automotive components with cast in place inserts and method of making same, filed Feb. 28, 2007.

Ulicny et al., U.S. Appl. No. 12/105,438, Filler material to dampen vibrating components, filed Apr. 18, 2008.

Hanna et al., U.S. Appl. No. 12/272,164, Surface configurations for damping inserts, filed Nov. 17, 2008.

Hanna et al., U.S. Appl. No. 12/145,169, Damped product with an insert having a layer including graphite thereon and methods of making and using the same, filed Jun. 24, 2008.

Lowe et al., U.S. Appl. No. 12/174,320, Damped part with insert, filed Jul. 16, 2008.

Xia, U.S. Appl. No. 11/858,596, Lightweight brake rotor and components with composite materials, filed Sep. 20, 2007.

Dessouki et al., U.S. Appl. No. 12/178,872, Friction damped brake drum, filed Jul. 24, 2008.

Sachdev et al., U.S. Appl. No. 11/832,356, Friction welding method and products made using the same, filed Aug. 1, 2007.

Chinese Patent Office First Office Action, Patent Application No. 200510113784.x, Date of Issue of OA: May 18, 2007; 41 pages.

Chinese Patent Office Second Office Action, Patent Application No. 200510113784.x, Date of Issue of OA: Feb. 15, 2008; 13 pp.

German Examination of Patent Application No. 10 2005 048 258.9; Dated Oct. 22, 200.

U.S. Appl. No. 12/420,259; Brake Rotor With Intermediate Portion; Filing Date: Apr. 8, 2009; Inventor: Michael D. Hanna.

U.S. Appl. No. 12/789,841; Interconnection for Cast-In-Place Components; Filing Date: May 28, 2010; Inventor: Richard M. Kleber.

Gerdemann, Steven J,; Titanium Process Technologies; Advanced Materials & Processes, Jul. 2001, pp. 41-43.

PCT/US2008/087354 Written Opinion and Search Report; Date of Mailing: Aug. 3, 2009; 9 pages.

PCT/US2009/039839 Written Opinion and Search Report; Date of Mailing: Nov. 24, 2009; 7 pages.

PCT/US2009/048424 Written Opinion and Search Report; Date of Mailing; Dec. 28, 2009; 7 pages.

U.S. Appl. No. 12/328,989; Filing Date: Dec. 5, 2008; First Named Inventor: Patrick J. Monsere.

U.S. Appl. No. 12/420,259; Filing Date: Apr. 8, 2009; First Named Inventor: Michael D. Hanna.

U.S. Appl. No. 12/434,057; Filing Date: May 1, 2009; First Named Inventor: Chongmin Kim.

U.S. Appl. No. 12/436,830; Filing Date: May 7, 2009; First Named Inventor: James G. Schroth.

U.S. Appl. No. 12/489,901; Filing Date: Jun. 23, 2009; First Named Inventor: Michael D, Hanna.

U.S. Appl. No. 12/885,813; Filing Date: Sep. 20, 2010; First named Inventor: Michael D. Hanna.

* cited by examiner

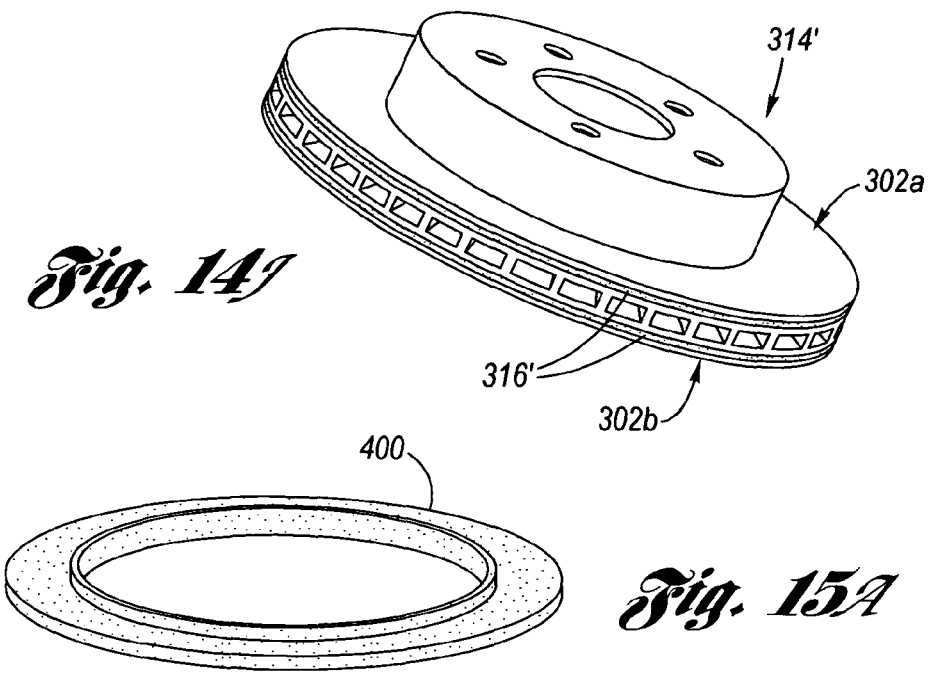
Fig. 14J
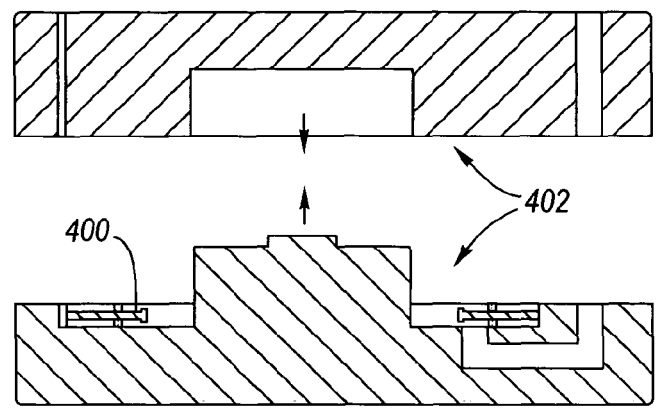
Fig. 15A
Fig. 15B
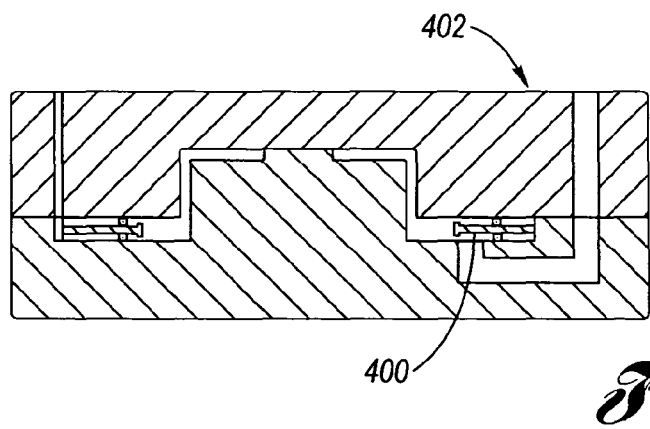
Fig. 15C

COULOMB FRICTION DAMPED DISC BRAKE ROTORS

TECHNICAL FIELD

The present invention relates to disc brake rotors used in automotive applications, and more particularly to Coulomb friction damped disc brake rotors in which the damping is provided by at least one interfacial boundary disposed in substantially coextensive relation with a braking surface of at least one rotor cheek thereof.

BACKGROUND OF THE INVENTION

Motor vehicle disc brake systems utilize a disc brake rotor at each respective wheel, wherein the disc brake rotor typically includes a rotor hat for connecting to an axle hub of a rotatable axle of the motor vehicle, and at least one annular rotor cheek connected to the rotor hat, wherein the at least one rotor cheek has a pair of mutually opposed braking surfaces onto which brake pads are selectively applied when braking is desired. Typically, the rotor cheek configuration may be solid, in which case a single rotor cheek has opposing braking surfaces thereon, or may be vented, in which case a pair of rotor cheeks are mutually separated by a web of ventilation vanes and each rotor cheek provides a respective braking surface so that, in combination, two mutually opposed braking surfaces are provided.

The disc brake system further typically includes a caliper which supports a mutually opposed pair of brake pads, one brake pad disposed overlying a respective rotor cheek braking surface, wherein the caliper, the brake pads, and other associated brake components collectively form a "brake corner". Normally, the caliper keeps the brake pads separated from the braking surfaces of the one or more rotor cheeks. Braking of the motor vehicle occurs at the brake corner by the caliper pressing the brake pads upon the braking surfaces of the one or more rotor cheeks. Frictional interaction between the one or more rotating rotor cheeks and non-rotating brake pads causes braking of the motor vehicle to transpire, the rate of braking depending upon the pressure of the brake pads against the braking surfaces.

Brake squeal can be undesirably generated at the brake corner when braking occurs. This brake squeal is the result of modal excitations of the disc brake rotor (composed usually of cast iron) by the frictional material of the brake pads. It is known in the prior art that brake squeal can be addressed by reducing modal excitation on the disc brake rotor by the friction material of the brake pads (ie., lowering the frictional coefficient), by modifying the modal excitation response of the brake corner via changing the modal properties of the rotor cheeks (ie., in terms of resonant frequencies, mode shapes, and structural damping through higher carbon content of the one or more rotor cheeks and/or increasing the disc brake rotor mass, or using exotic, expensive materials), and by introducing additional damping for example via a shim disposed at a backing plate of the brake pads.

The aforementioned brake squeal countermeasures are relatively effective for most brake corner designs, but they require a significant amount of testing and analytical resources in order to be effective. And unfortunately, brake corners for performance motor vehicles, or those motor vehicles with high friction lining materials, are resistant to the prior art brake squeal countermeasures, due to the high amount of modal excitation from the friction material of the brake pads.

U.S. Pat. No. 5,855,257 describes a concept directed toward reducing unwanted disc brake noise via a ring damper affixed around the periphery of the disc brake rotor in a manner which permits relative motion and slippage between the ring damper and the disc brake rotor when the disc brake rotor vibrates during braking. In a preferred embodiment, a groove formed at the periphery of the rotor cheek and the ring damper is disposed in the groove with a pre-loading both radially and transversely.

While the concept described in U.S. Pat. No. 5,855,257 is noteworthy in that an attempt is made to apply Coulomb friction damping to reduce brake squeal, it falls short of this goal. The reason for this is the requirement that the ring damper must be peripherally disposed on the disc brake rotor. Unfortunately, the modal excitations induced during braking at the brake corner arise at the contact between the brake pads and the braking surfaces of the one of more rotor cheeks. Therefore, reliance on radial loading that the peripheral placement of the damping ring of U.S. Pat. No. 5,855,257 cannot achieve adequate brake squeal damping in the region of the disc brake rotor coextensively with the braking surfaces of the rotor cheek.

Accordingly, what remains needed in the art is to somehow provide damping disposed in generally coextensive relation to the braking surfaces of the one or more rotor cheeks.

SUMMARY OF THE INVENTION

The present invention is a Coulomb friction damped disc brake rotor, wherein damping of the modal excitations is provided generally coextensively with the braking surfaces of the one or more rotor cheeks.

The Coulomb friction damped disc brake rotor according to the present invention has at least one interfacial boundary formed in at least one rotor cheek which is disposed in generally coextensive relation to the braking surface thereof. In this regard, by "interfacial boundary" is meant a mechanically distinguishable surface boundary between two surfaces which are in mutual contact such that a state of Coulomb friction exists therebetween, and wherein the term "Coulomb friction" represents the energy absorption processes at the interface between two material surfaces through mechanical interaction of the surfaces, as for example temperature, pressure, time, etc.

In a preferred embodiment of the Coulomb friction damped disc brake rotor according to the present invention, an insert is disposed in at least one rotor cheek of a disc brake rotor having either a solid or vented rotor cheek configuration, wherein the insert provides mutually opposed interfacial boundaries with respect to the surrounding rotor cheek, and wherein the insert is annularly configured and disposed generally coextensively with a braking surface of the rotor cheek. Alternatively, a plurality of inserts may be provided in the one or more rotor cheeks. Alternatively further, the interfacial boundary may be provided by an interstice formed in the rotor cheek in which the surfaces of rotor cheek which define the interstice mutually form therebetween the interfacial boundary, wherein any number of interstices may be provided in one or more rotor cheeks.

In a method of manufacture of the Coulomb friction damped disc brake rotor according to the present invention, the subject rotor cheek may be machined or molded with one or more interstices so as to provide an interfacial boundary at each, or is machined or molded to provide one or more annular slots into each of which an insert is respectively cast, inserted, wound into or otherwise located therein so as to provide a pair of interfacial boundaries at each insert. In another method of manufacture according to the present invention, the subject rotor cheek is molded around one or more pre-manufactured inserts.

It is further believed that a Coulomb friction damped disc brake rotor according to the present invention has the following attributes: 1) the greater the surface area of the interfacial boundaries, the greater will be the damping; 2) the greater the number of interfacial boundaries, the greater will be the damping; 3) pre-tensioning and/or pre-loading is not required so long as the interfacial boundary provides Coulomb friction damping; and finally, 4) the thickness of the insert may be optimized based upon experimentation (ie., a smallest possible thickness while still providing at least one interfacial boundary), and it is thought to be optimal if the thickness of the insert is small relative to the thickness of the rotor cheek While the noise damping benefits of the invention have been developed for brake rotor applications, it is apparent that the invention may be utilized in other articles having body portions that are subject to mechanical vibrations and body surfaces that radiate noise. It is apparent that the inclusion of one or more interstices or inserts can be used within body portions of such articles and near noise making surfaces to provide a damped article.

Accordingly, it is an object of the present invention to provide a Coulomb friction damped disc brake rotor, wherein damping is provided generally coextensively with the braking surfaces of the one or more rotor cheeks. An alternative embodiment of the invention provides a damped article having a noise producing surface on a body portion wherein sound damping is provided within the body using an interstice(s) and/or an insert(s) within the body to provide friction engaging surfaces for reducing noise.

This and additional objects, features and advantages of the present invention will become clearer from the following specification of a preferred embodiment.

BRIEF DESCRIPTION OF THE DRAWINGS

FIGS. 14F through 14J depict sequences of manufacture of a Coulomb friction damped disc brake rotor having a vented rotor cheek configuration, in which FIG. 14G pertains to providing a metallic insert molded into, respectively, an annular slot of each of the two rotor cheeks, and FIG. 14H pertains to providing a polymer, ceramic or metal powder insert molded into or otherwise located in, respectively, the annular slot of each of the two rotor cheeks.

FIGS. 15A through 15F depict sequential views of a method of manufacture of a Coulomb friction damped disc brake rotor having a solid rotor cheek configuration, wherein an insert is pre-manufactured and the disc brake rotor is cast therearound.

DESCRIPTION OF THE PREFERRED EMBODIMENT

Figure 1:
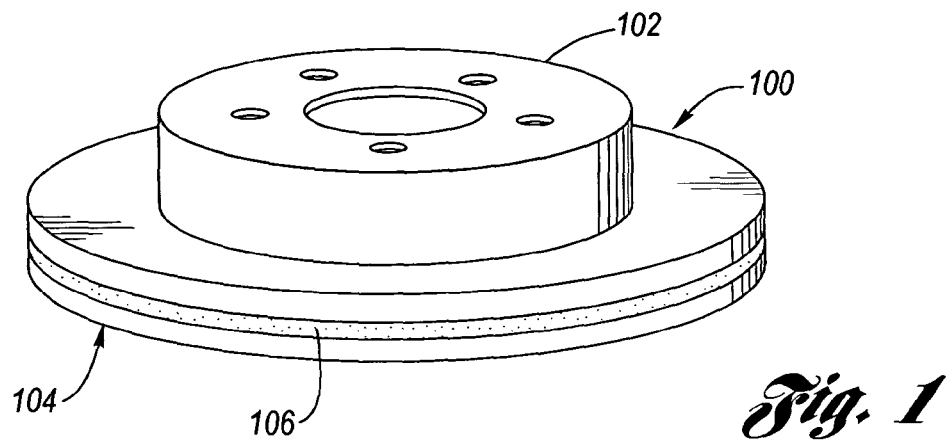
FIG. 1 is a perspective view of a Coulomb friction damped disc brake rotor according to the present invention having a solid rotor cheek configuration and a single insert.

Referring now to the Drawing, FIGS. 1 through 7 depict various aspects of an example of a Coulomb friction damped disc brake rotor 100 for motor vehicle disc brake applications according to the present invention, FIGS. 8 through 12 depict various alternative configurations of a Coulomb friction damped disc brake rotor according to the present invention, and FIGS. 13A through 15M depict various examples of manufacturing methods for a Coulomb friction damped disc brake rotor according to the present invention.

Figure 2:
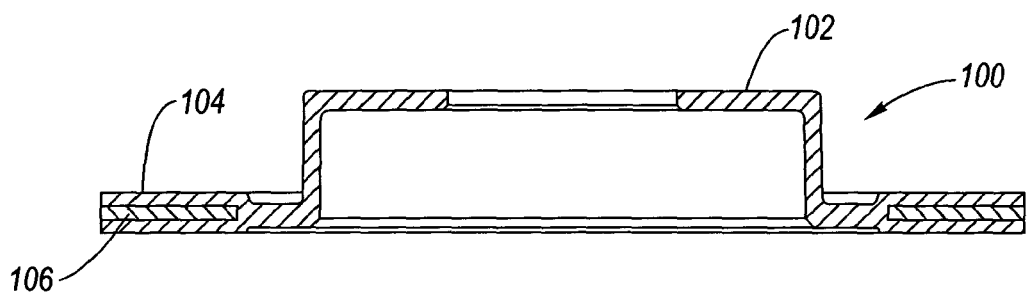
FIG. 2 is a sectional view of the Coulomb friction damped disc brake rotor of FIG. 1.
Figure 3:
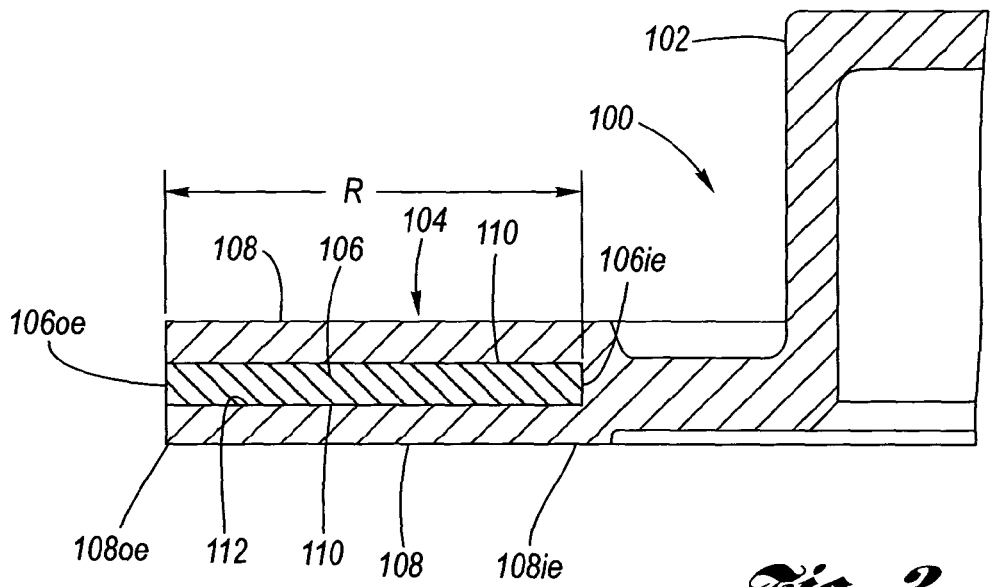
FIG. 3 is a detail of the sectional view of FIG. 2, showing in particular the rotor cheek and its insert.

Turning attention firstly to FIGS. 1 through 3, the Coulomb friction damped disc brake rotor 100 has, by way of non-limiting example, a rotor hat 102 (which need not be present for purposes of the present invention), a rotor cheek 104 of solid rotor cheek configuration, and an insert 106 disposed within the rotor cheek, wherein the insert is generally coextensive with the braking surfaces 108 of the rotor cheek. In this regard, the insert 106 radially extends, from a radially inward edge 106*ie* to a radially outward edge 106*oe*, a distance R which is generally coextensive with the radial extent of the radially inward edge 108*ie* and the radially outward edge 108*oe* of the braking surfaces 108 of the rotor cheek 104, and further annularly extends around the rotor cheek. The insert 106 provides a pair of oppositely disposed interfacial boundaries 110 between the insert and the rotor cheek 104, wherein the interfacial boundaries each have a mechanically distinguishable surface boundary between two surfaces which are in mutual contact such that a state of Coulomb friction exists therebetween.

Figure 4:
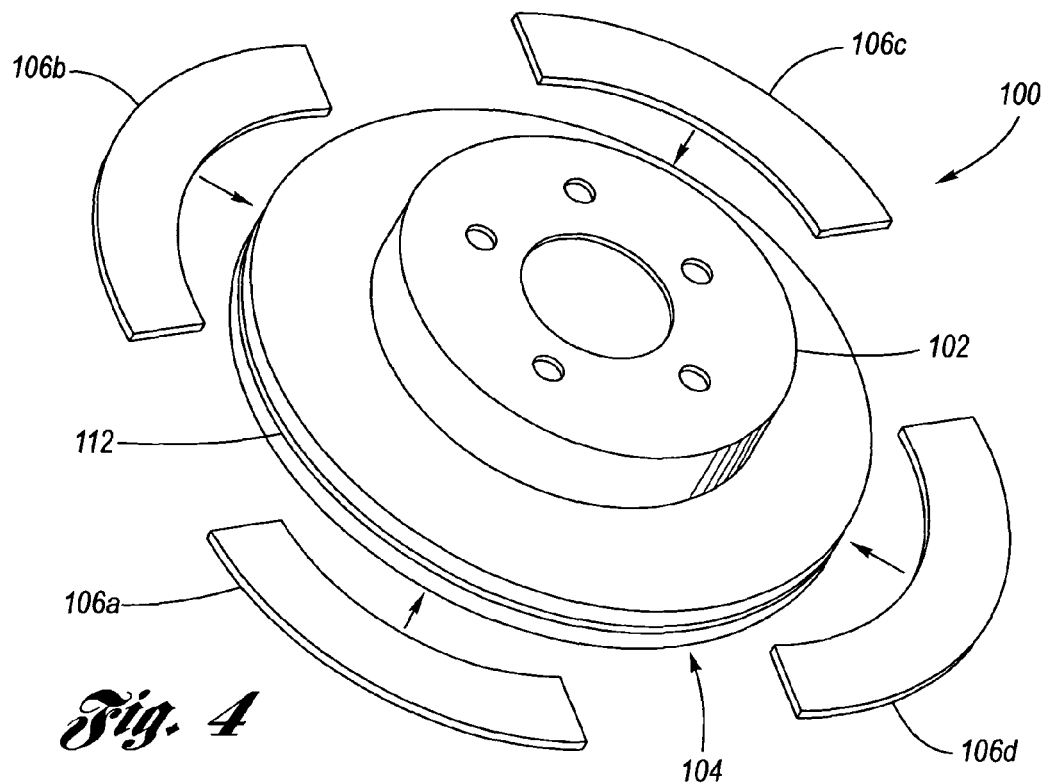
FIG. 4 is an exploded perspective view of the Coulomb friction damped disc brake rotor of FIG. 1.

FIG. 4 depicts a manufacturing methodology for the Coulomb friction damped disc brake rotor 100 of FIGS. 1 through 3, in which an annular slot 112 is machined radially into the rotor cheek 104 so as to be generally coextensive with the braking surfaces, and wedge shaped insert components 106*a*, 106*b*, 106*c* and 106*d* (there could be alternatively two semicircular insert components) are pressed into the slot to thereby collectively form the insert 106 shown at FIGS. 1 through 3.

Figure 5:
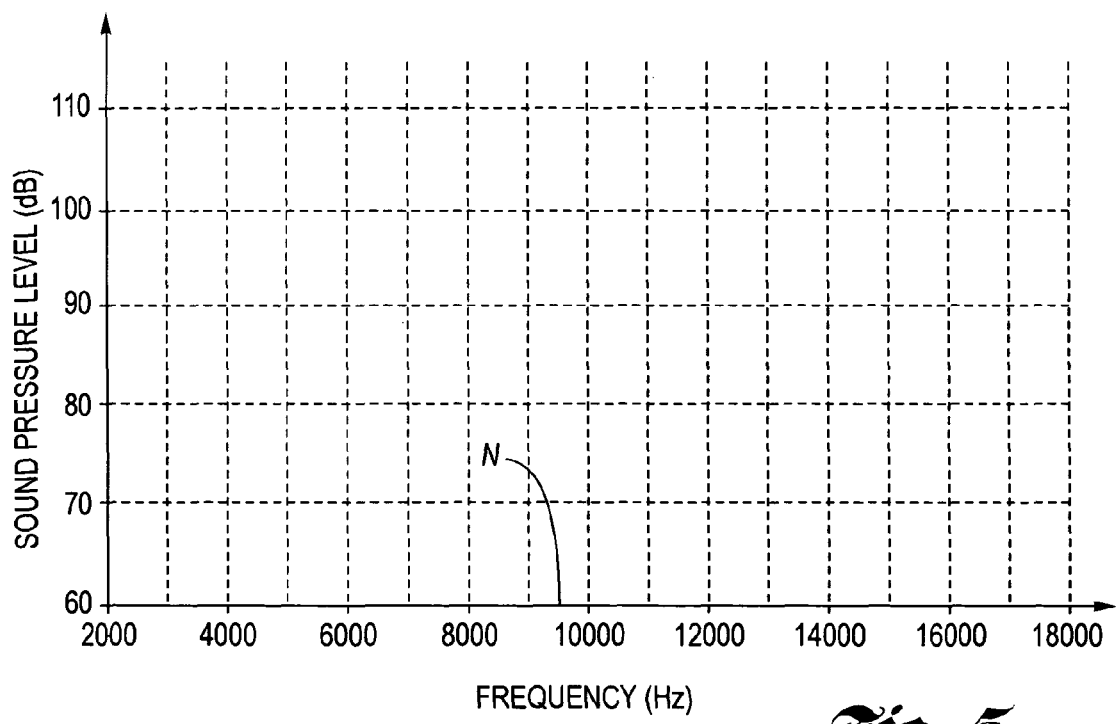
FIG. 5 is a plot of brake squeal of the Coulomb friction damped disc brake rotor of FIG. 1, wherein the plot is of squeal frequency versus sound pressure, and wherein the plot is undetectably small.
Figure 6:
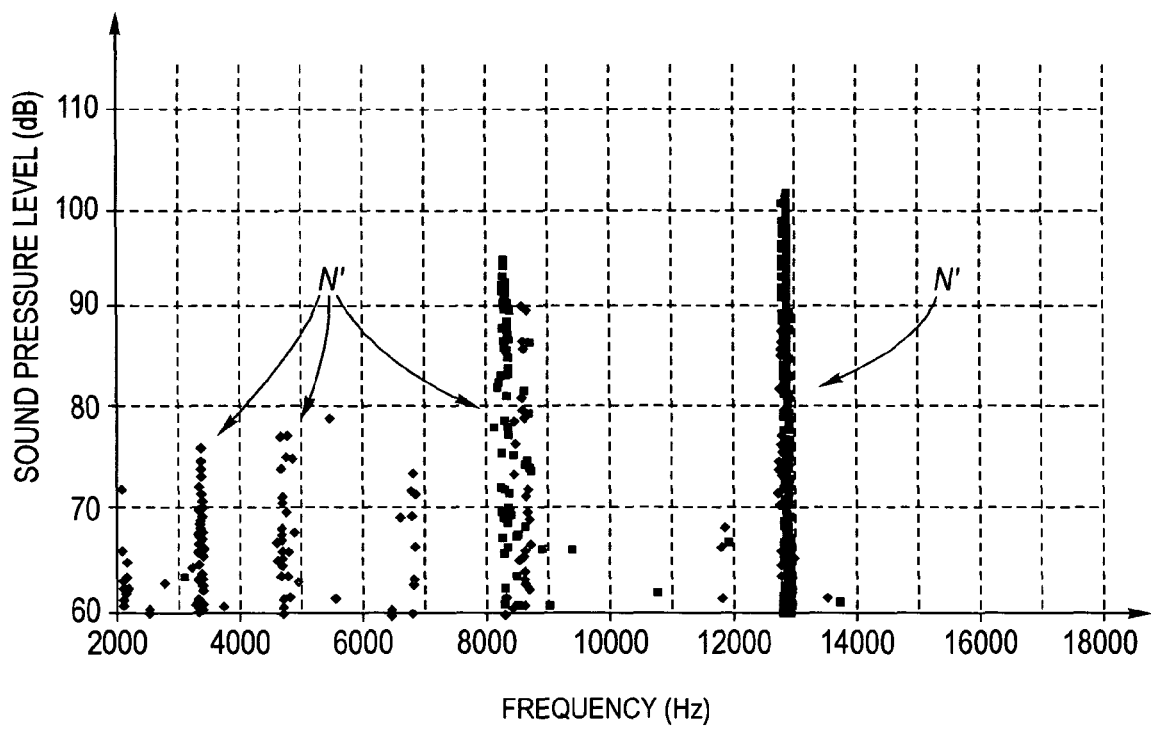
FIG. 6 is a plot of brake squeal of a conventional disc brake rotor without damping, wherein the plot is of squeal frequency versus sound pressure.

FIGS. 5 through 6 show comparative brake corner noise data obtained utilizing a brake noise dynamometer of the Coulomb friction damped disc brake rotor 100 and a conventional disc brake rotor without damping, referred to hereafter as a "baseline" disc brake rotor. The resulting test plots were generated by utilizing using identical test procedures, dynamometers and brake corners for each of the Coulomb friction damped disc brake rotor 100 and the baseline disc brake rotor. The noise plot N depicted in FIG. 5 is that of the Coulomb friction damped disc brake rotor 100 and has a magnitude too small to be detected, indicating the brake corner is quiet. In contradistinction, noise plot N' of the baseline brake disc rotor depicted in FIG. 6 shows a high magnitude of noise both in the warm section (diamond symbols) and the cold section (square symbols) thereof. The difference between the noise plots N, N' was due to the high level of damping occurring only at the Coulomb friction damped disc brake rotor 100 according to the present invention.

Figure 7:
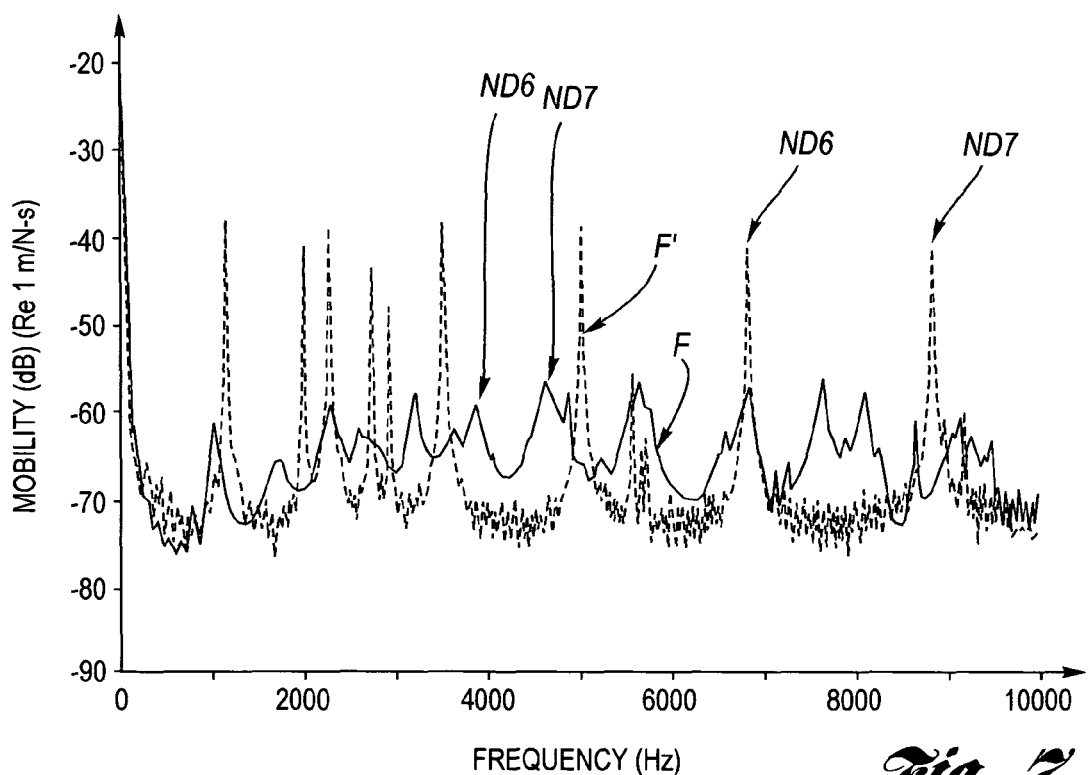
FIG. 7 is a comparative set of plots for frequency response functions of the Coulomb friction damped disc brake rotor of FIG. 1 and the conventional disc brake rotor without damping, wherein the plots are of vibrational frequency versus mobility.

FIG. 7 shows frequency response function (FRF) test plots comparatively of the FRF plot F for the Coulomb friction damped disc brake rotor 100 and of the FRF plot F' of the baseline disc brake rotor. It will be seen that the Coulomb friction damped disc brake rotor 100 had a greater than one order of magnitude increase in damping (disc brake rotor loss factor) as compared to that of the baseline disc brake rotor. In this regard, the 6th nodal diametrical mode ND6 for the Coulomb friction damped disc brake rotor has a loss factor greater than 0.037, whereas ND6 for the baseline disc brake rotor has a loss factor of 0.0012; and the 7th nodal diametrical mode ND7 for the Coulomb friction damped disc brake rotor has a loss factor greater than 0.046, whereas ND7 for the baseline disc brake rotor has a loss factor of 0.0010. Again, this result is attributed to the damping occurring only in the Coulomb friction damped disc brake rotor 100 according to the present invention.

Turning attention now to FIGS. 8 through 12, various alternative embodiments of the Coulomb friction damped disc brake rotor according to the present invention will be discussed.

Figure 8:
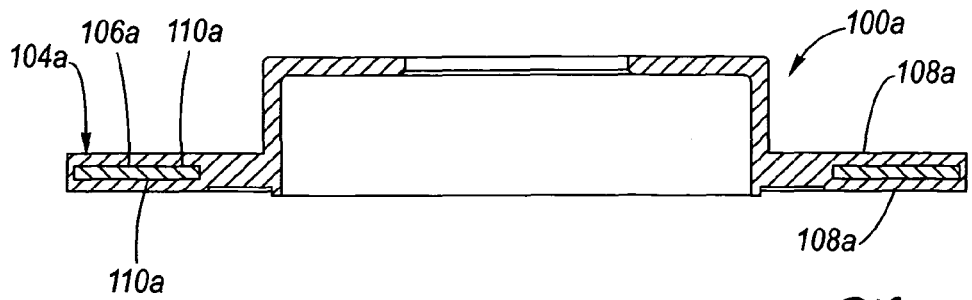
FIG. 8 is an alternative embodiment of a Coulomb friction damped disc brake rotor according to the present invention, wherein the insert is fully embedded within a rotor cheek.

FIG. 8 depicts an alternative embodiment of a Coulomb friction damped disc brake rotor 100*a* according to the present invention in which the insert 106*a* is generally coextensive with the braking surfaces 108*a*, and is completely surrounded by the rotor cheek 104*a*, providing a pair of interfacial boundaries 110*a*. This embodiment of the Coulomb friction damped disc brake rotor is applicable to solid or vented rotor cheek configurations, a solid rotor cheek configuration being shown merely by way of exemplification.

Figure 9:
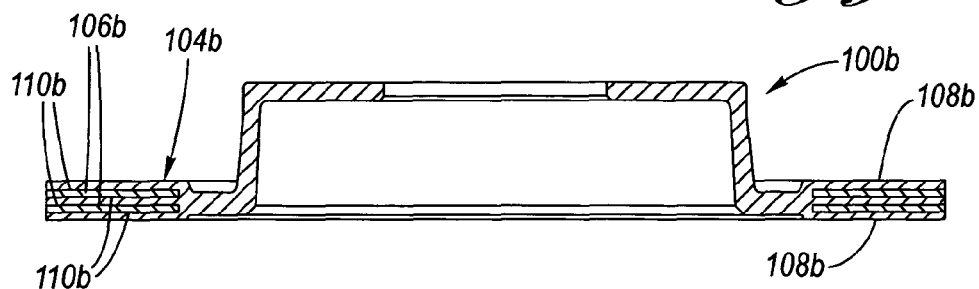
FIG. 9 is another alternative embodiment of a Coulomb damped disc brake rotor according to the present invention, wherein a pair of inserts are provided in a rotor cheek.

FIG. 9 depicts another alternative embodiment of a Coulomb friction damped disc brake rotor 100*b* according to the present invention in which the insert 106*a* is generally coextensive with the braking surfaces 108*b*, and in which a pair of inserts 106*b* are disposed within the same rotor cheek 104*b*, each providing a pair of interfacial boundaries 110*b* (in this regard, if they touch then they would share an interfacial boundary). It will be understood that while two inserts are shown, any number of inserts may be provided. It will further be understood that an embodiment having a plurality of inserts is applicable to both a solid rotor cheek configuration and to each, or either, rotor cheek of a vented rotor cheek configuration.

Figure 10A:
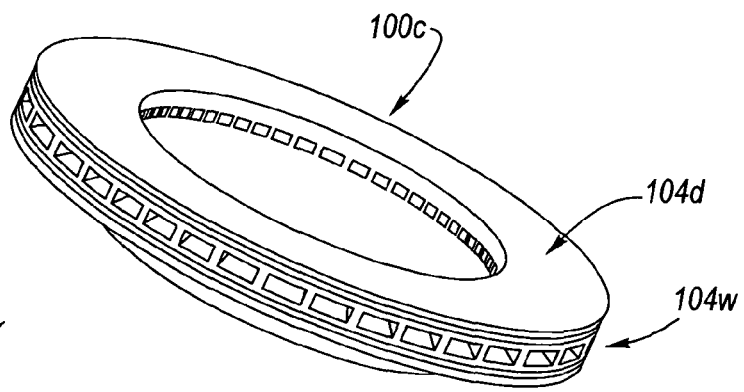
FIGS. 10A through 10C depict various views of a Coulomb friction damped disc brake rotor having a vented rotor cheek configuration in which an insert is provided at each cheek, and wherein an anchorage is provided at the radially inward end of the inserts.
Figure 10B:
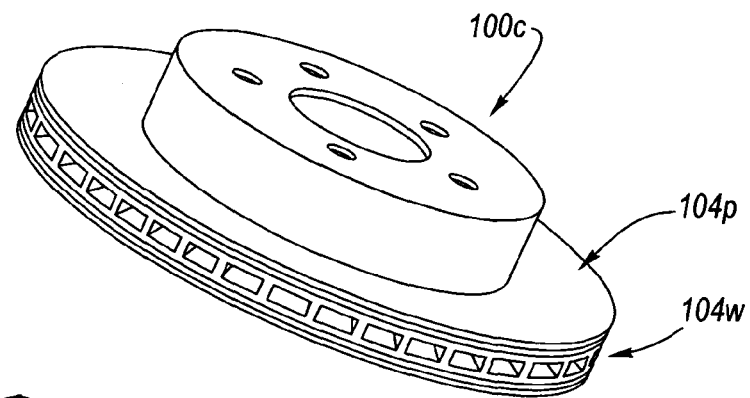
Figure 10C:
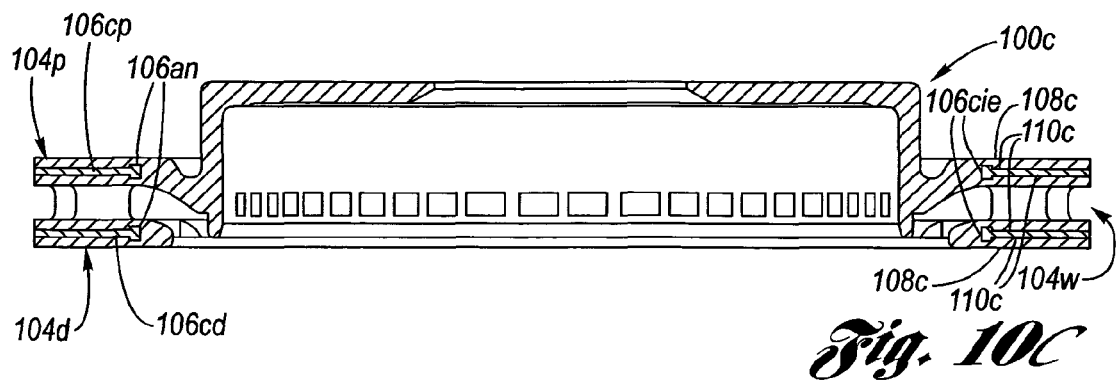

FIGS. 10A through 10C depict yet another embodiment of a Coulomb friction damped disc brake rotor 100*c* according to the present invention having a vented rotor cheek configuration composed of a first (hat proximal) rotor cheek 104*p* and a second (hat distal) rotor cheek 104*d*, the rotor cheeks being mutually separated by a web 104*w* of ventilation vanes. An insert 106*cp* is provided in the first rotor cheek 104*p* and an insert 106*cd* is provided in the second rotor cheek 104*d*, both inserts being generally coextensive with the braking surfaces 108*c*, and each providing a pair of interfacial boundaries 110*c*. Optionally, an anchorage 106*an* is provided at the radially inward edge 106*cie*, wherein the anchorage is in the preferable form of a bulbous which interferingly engages the surrounding rotor cheek.

Figure 11A:
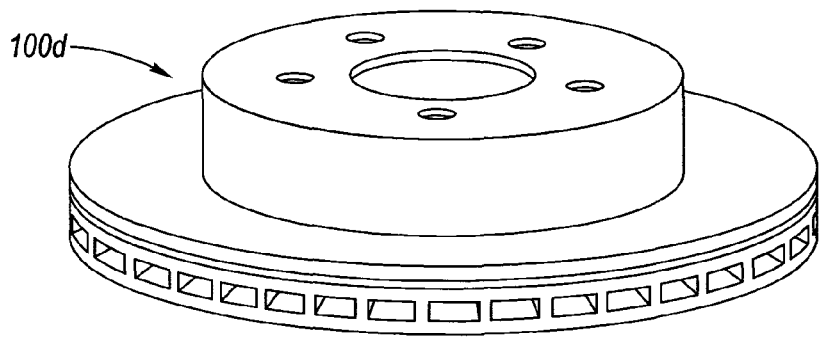
FIGS. 11A and 11B depict various views of a Coulomb friction damped disc brake rotor having a vented rotor cheek configuration in which an insert is provided only at a single rotor cheek (the hat proximal rotor cheek), and wherein an anchorage is provided at the radially inward end of the insert.
Figure 11B:
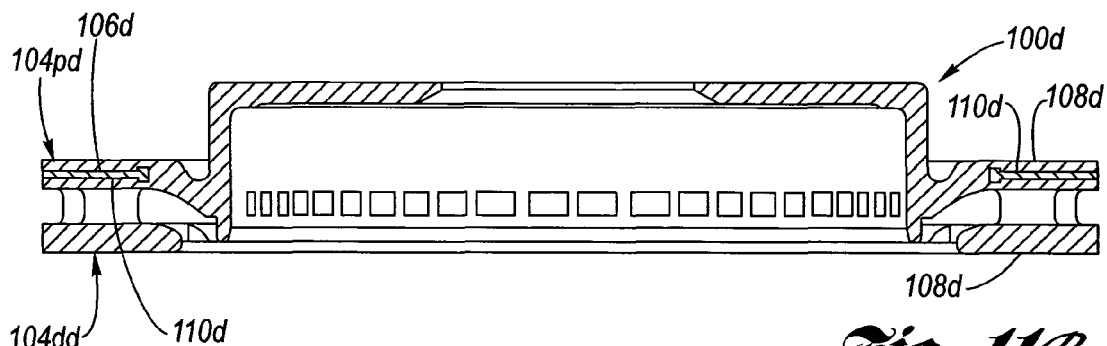

FIGS. 11A and 11B depict still another embodiment of a Coulomb friction damped disc brake rotor 100*d* according to the present invention having a vented rotor cheek configuration in which only the first (hat proximal) rotor cheek 104*pd* has an insert 106*d* which generally coextensively extends with the braking surfaces 108*d*, and providing a pair of interfacial boundaries 110*d*. The second (hat distal) rotor cheek 104*dd* has no insert.

Figure 11C:
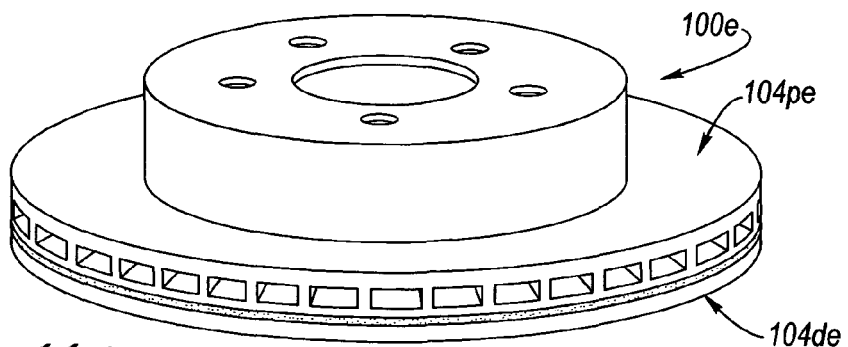
FIGS. 11C and 11D depict various views of a Coulomb friction damped disc brake rotor having a vented rotor cheek configuration in which an insert is provided only at a single rotor cheek (the hat distal rotor cheek), and wherein the rotor cheek having the insert is shown optionally thicker than the rotor cheek having no insert.
Figure 11D:
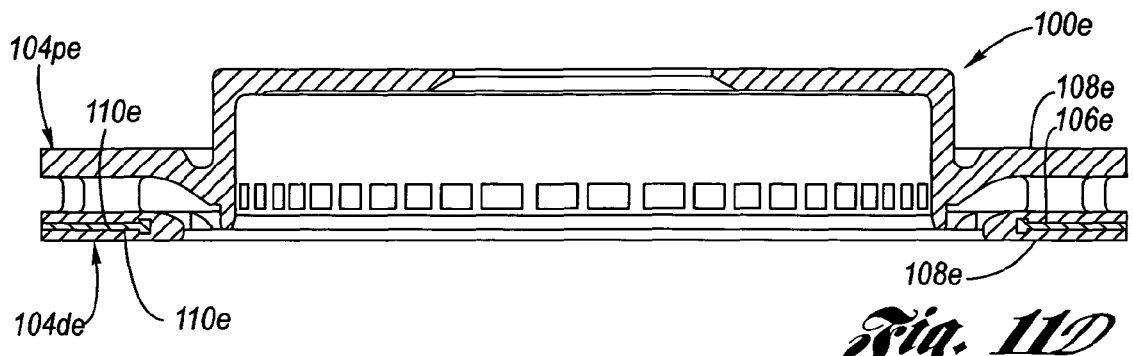

FIGS. 11C and 11D depict an additional embodiment of a Coulomb friction damped disc brake rotor 100*e* according to the present invention having a vented rotor cheek configuration in which only the second (hat distal) rotor cheek 104*de* has an insert 106*e* which generally coextensively extends with the braking surfaces 108*e* and provides a pair of interfacial boundaries 110*e*. The first (hat proximal) rotor cheek 104*pe* has no insert. Now, by way merely of example, the second rotor cheek 104*de* is thicker than the first rotor cheek 104*pe* so as to accommodate the thickness of the insert 106*e*; however, this increased thickness is an optional feature.

It is to be understood that all the variations of Coulomb friction damped disc brake rotor embodiments exemplified above may be mixed and varied. For example, a single rotor cheek, or both rotor cheeks, of a vented rotor cheek configuration may have a plurality of inserts.

Figure 12A:
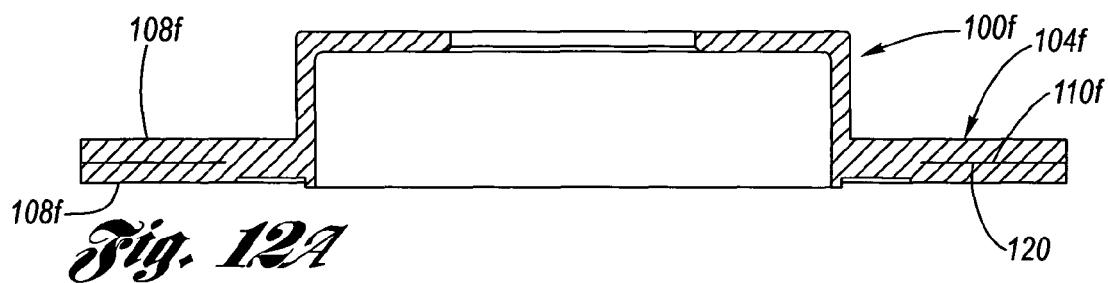
FIGS. 12A and 12B depict another alternative embodiment of a Coulomb friction damped disc brake rotor according to the present invention, wherein at least one interstice provides at least one interfacial boundary in a rotor cheek.
Figure 12B:
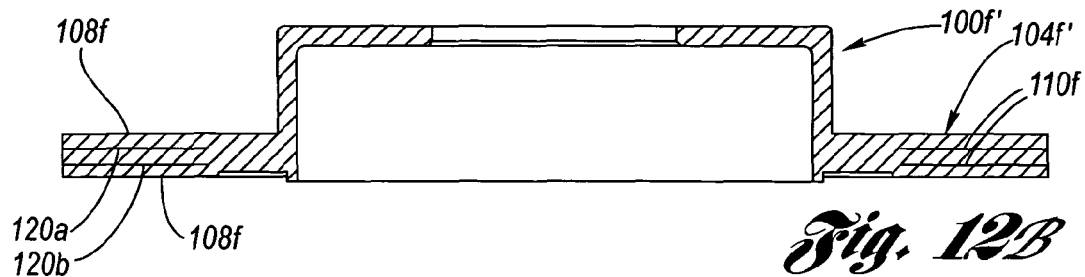

FIG. 12A depicts yet another embodiment of a Coulomb friction damped brake rotor 100*f* according to the present invention in which an interfacial boundary 110*f* is provided by an interstice 120 formed in the rotor cheek 104*f*, wherein the surfaces of rotor cheek which define the interstice mutually form therebetween the interfacial boundary, and whereat therebetween Coulomb friction is present. The interstice is generally coextensive with the braking surfaces 108*f*. FIG. 12B depicts a Coulomb friction damped disc brake rotor 100*f*, wherein a plurality of interstices 120*a*, 120*b* each provide an interfacial boundary 110*f* in the rotor cheek 104*f* thereof, wherein the interstices each are generally coextensive with the braking surfaces 108*f*. It is to be understood that one or more interstices may be provided in one or both rotor cheeks of a vented rotor cheek configuration.

Referring now to FIGS. 13A through 15M, various exemplar methodologies of manufacture of a Coulomb friction damped disc brake rotor according to the present invention will be detailed, wherein it is to be understood that the methodologies presented herein are merely by way of exemplification and not limitation.

Figure 13A:
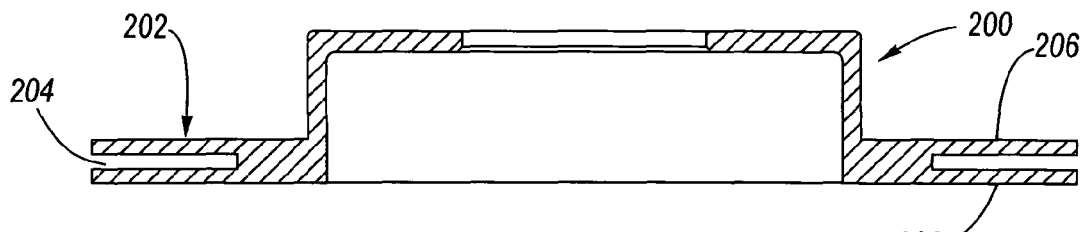
FIGS. 13A through 13C depict sequential views of manufacture of a Coulomb friction damped disc brake rotor having a solid rotor cheek configuration, wherein the insert is wound into an annular slot of the rotor cheek.
Figure 13B:
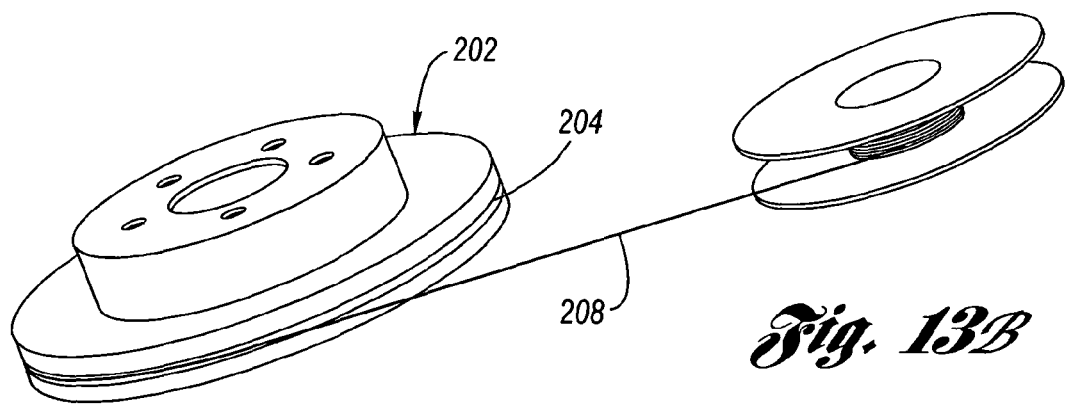
Figure 13C:
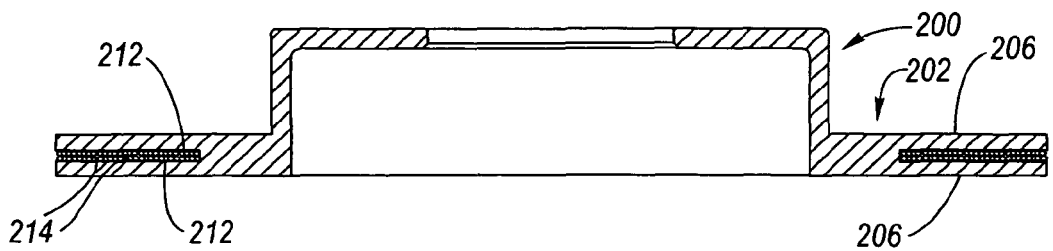

In FIGS. 13A through 13C, a disc brake rotor 200 has a rotor cheek 202 of solid rotor cheek configuration, having an annular slot 204 provided therein, as for example by being machined therein or provided at the time of casting. The annular slot 204 extends radially inward so as to be generally coextensive with the braking surfaces 206 of the rotor cheek 202. As shown at FIG. 13B, a filament 208 is wound into the slot 204 so as to form an insert 210 coextensive with the braking surfaces 206, thereby providing a Coulomb friction damped disc brake rotor 216, as depicted in FIG. 13C. The Coulomb friction damped disc brake rotor 216 has interfacial boundaries 212 with the rotor cheek 202 so as to have damping therewith, and, advantageously, has additional damping at the interfacial boundaries 214 at the mutually contacting surfaces of the filament 208. The filament 208 is non-limiting, and includes any highly elongated material capable of being wound into the slot, as for example metallic wire or thread of non-metallic material.

Figure 13D:
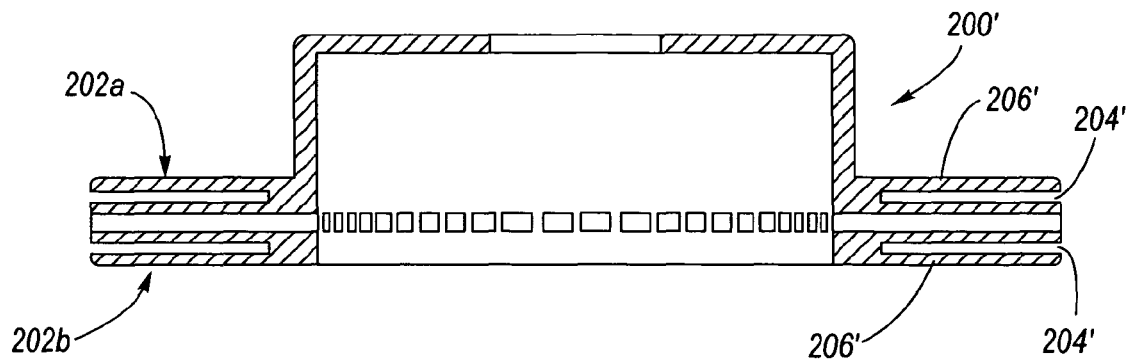
FIGS. 13D through 13F depict sequential views of manufacture of a Coulomb friction damped disc brake rotor having a vented rotor cheek configuration, wherein an insert is wound, respectively, into each annular slot of the two rotor cheeks.
Figure 13E:
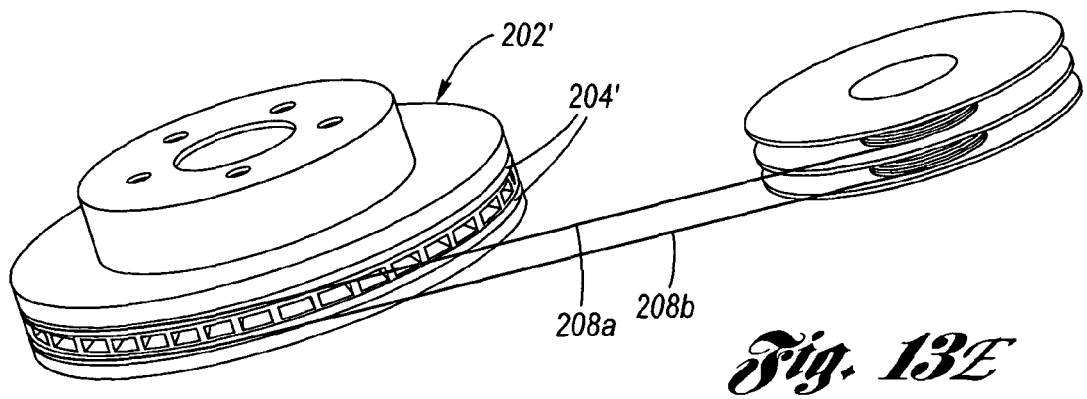
Figure 13F:
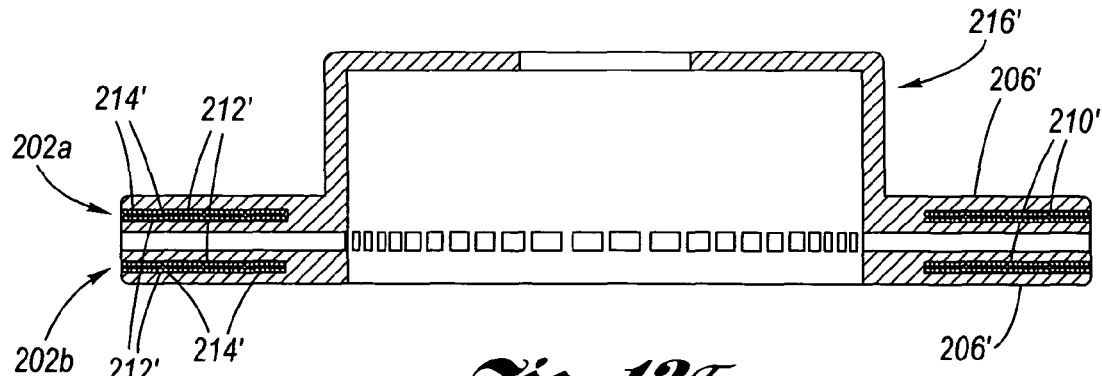

FIGS. 13D through 13F depict sequential manufacturing steps as those described in FIGS. 13A through 13C, wherein now a disc brake rotor 200' having vented rotor cheek configuration having two rotor cheeks 202*a*, 202*b* with braking surfaces 206' is depicted, and wherein now primes denote similar functioning parts as those described above in FIGS. 13A through 13C. In this regard, the Coulomb friction damped disc brake rotor 216' has filaments 208*a*, 208*b* wound, respectively, into each annular slot 204' so as to thereby form inserts 210' which are generally coextensive with the braking surfaces 206'. Each of the inserts 210' provide interfacial boundaries 212' in each of the two rotor cheeks 202*a*, 202*b* so as to have damping therewith, and, advantageously, has additional damping at the interfacial boundaries 214' at the mutually between contacting surfaces of each filament 208*a*, 208*b*.

Figure 14A:
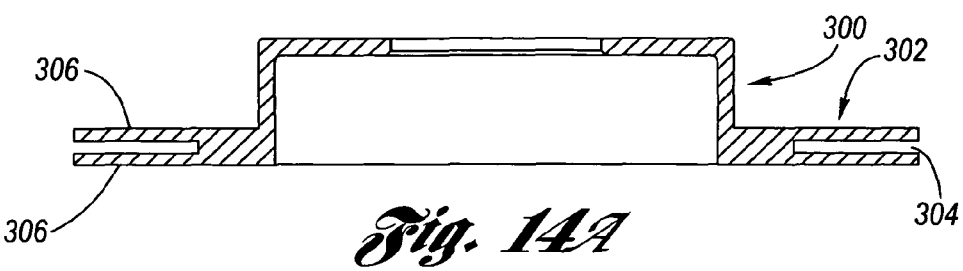
FIGS. 14A through 14E depict sequences of manufacture of a Coulomb friction damped disc brake rotor having a solid rotor cheek configuration, in which FIG. 14B pertains to providing a metallic insert molded into an annular slot of the rotor cheek, and FIG. 14C pertains to providing a polymer, ceramic or metal powder insert molded into or otherwise located in the annular slot of the rotor cheek.
Figure 14B:
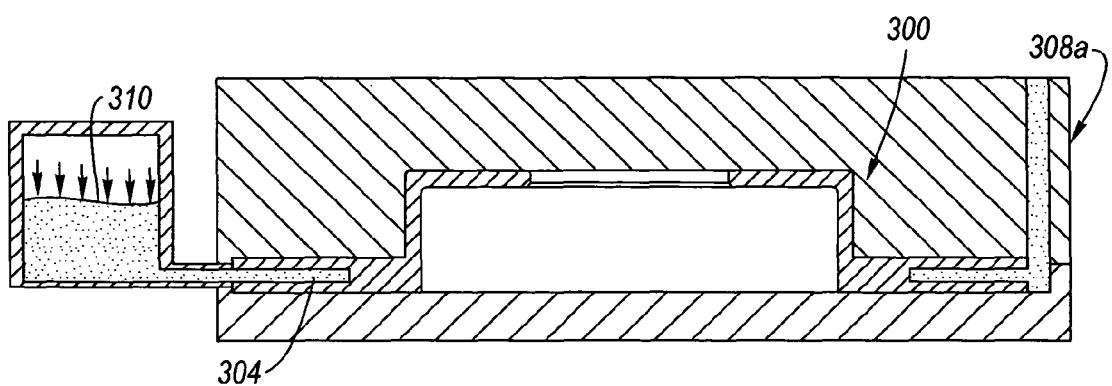
Figure 14C:
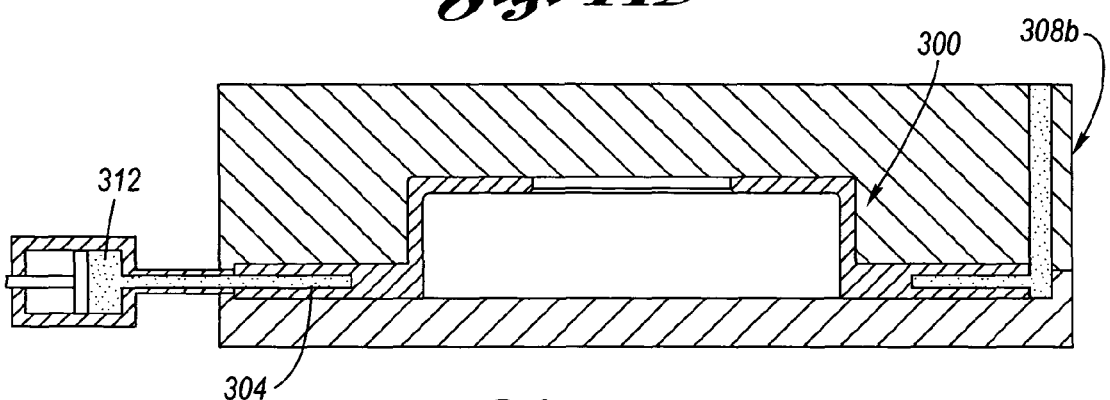
Figure 14D:
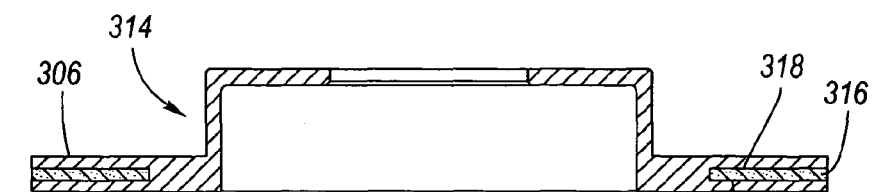
Figure 14E:
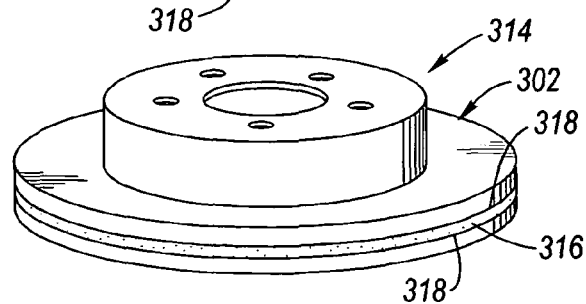
Figure 14F:
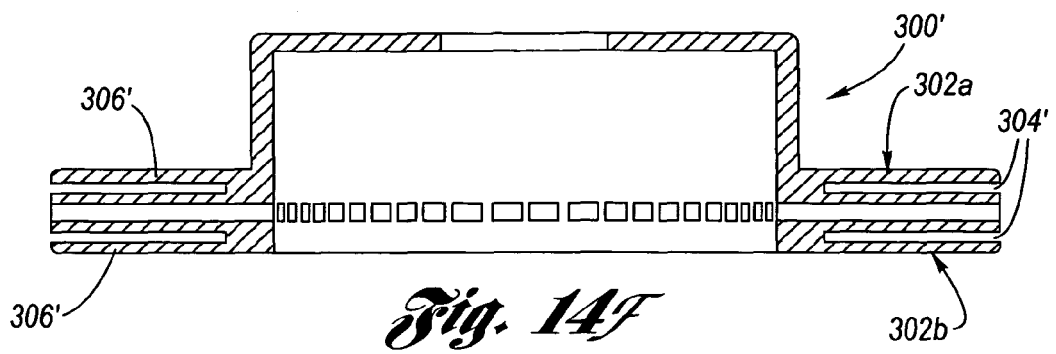
Figure 14G:
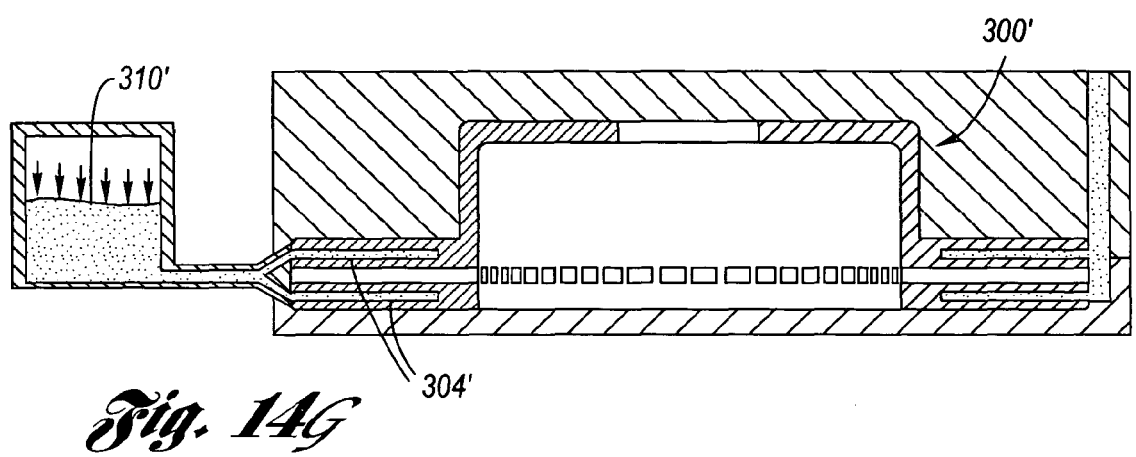
Figure 14H:
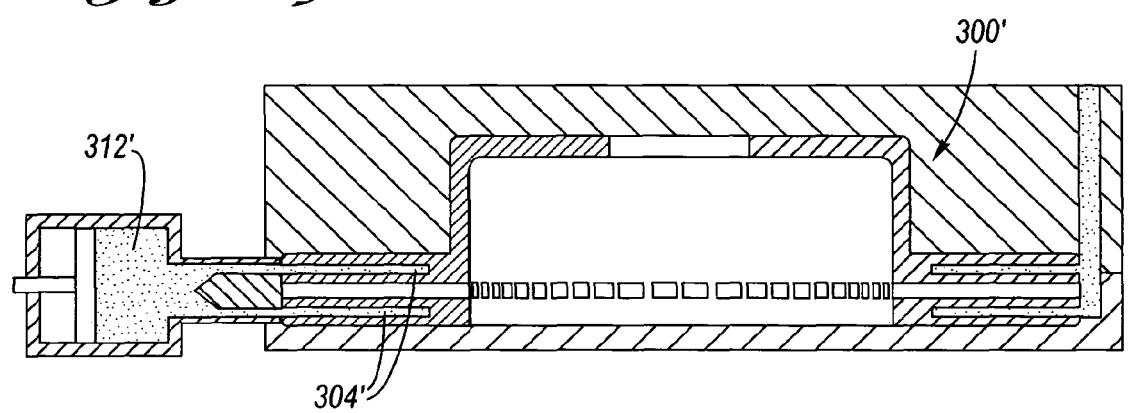
Figure 14I:
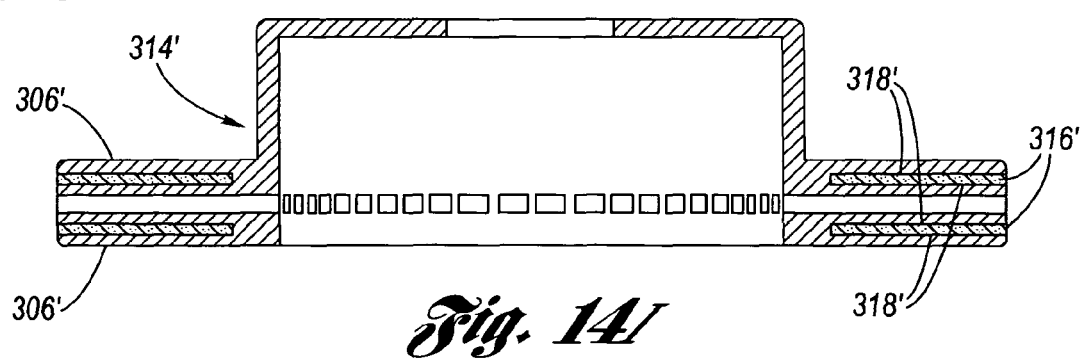

In FIGS. 14A through 14E, a disc brake rotor 300 has a rotor cheek 302 of solid rotor cheek configuration, having an annular slot 304 provided therein, as for example by being machined therein or provided at the time of casting. The annular slot 304 extends radially inward so as to be generally coextensive with the braking surfaces 306 of the rotor cheek 302. The disc brake rotor 300 is placed into a mold 308*a*, 308*b*. In a first case of manufacture, shown at FIG. 14B, molten metal 310 of a preselected composition to maximize damping and ease of casting is molded by being cast or injected into the annular slot 304. In a second case of manufacture, shown at FIG. 14C, a high temperature polymer, a metal powder, or a ceramic paste 312 is molded by being injected into the annular slot 304. In this regard if a metal powder is used, the powder is compacted into the annular slot under pressure then placed in an oven and sintered in a controlled atmosphere at elevated temperature so that the powder coalesces into a solid body with a predefined porosity (which can be zero), wherein a tolerance, for example, of 0.3% is expected, and if a suitable coating in the slot is used to lessen gapping at the interface boundary with the rotor cheek, a tolerance, for example, of 0.1% can be expected. In either case of manufacturing methods shown in FIGS. 14A through 14E, a Coulomb friction damped disc brake rotor 314 is provided, as shown at FIGS. 14D and 14E, wherein the insert 316 provided thereby in the annular slot is generally coextensive with the braking surfaces 306 and provides a pair of interfacial boundaries 318.

It is to be noted that if the annular slot 304 is cast into the rotor cheek 302, then no machining need be provided, and the disc brake rotor 300 is placed into the mold 308*a*, 308*b*. In order that the material used for the insert 316 be subsequently locked into place, the groove may be sprayed with a coating or otherwise have the surface thereof treated (e.g., shot peening or surface roughing), or an aforementioned anchorage (that is, a mechanical interlock) can be pre-cast into the annular slot 304. The coating and insert material composition have a synergistic relationship to provide optimum interfacial boundaries between the disc brake rotor and the solidified insert to maximize damping and minimize brake noise. The molding of the insert subsequent to the casting of the disc brake rotor can be achieved by any suitable means including, for example, a permanent mold die, or the disc brake rotor can be used as an insert in a die casting machine.

FIGS. 14F through 14J depict sequential manufacturing steps as those described in FIGS. 14A through 14E, wherein now a Coulomb friction damped disc brake rotor 314' having a vented rotor cheek configuration having two rotor cheeks 302*a*, 302*b* is provided, starting with a disc brake rotor 300', wherein now primes denote similar functioning parts as those described above in FIGS. 14A through 14E. In this regard, the Coulomb friction damped disc brake rotor 314' has a molded insert 316' provided at FIGS. 14G and 14H, per any of the manufacturing methodologies described above with respect to FIGS. 14B and 14C, respectively, in each annular slot 304'. The inserts 316 are generally coextensive with the braking surfaces 306' and provide interfacial boundaries 318' in each of the two rotor cheeks 302*a* 302*b* so as to have damping therewith.

Figure 15D:
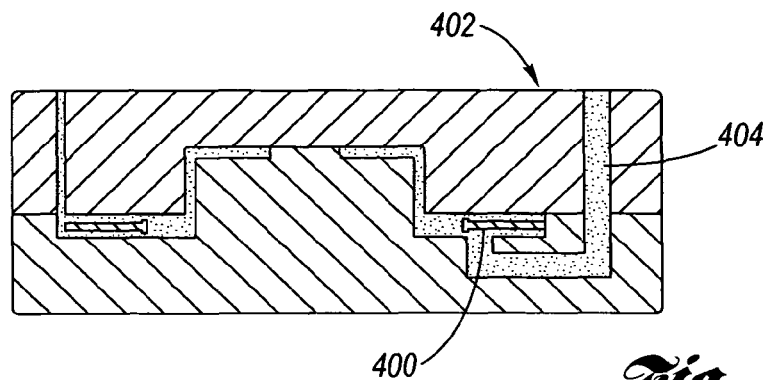
Figure 15E:
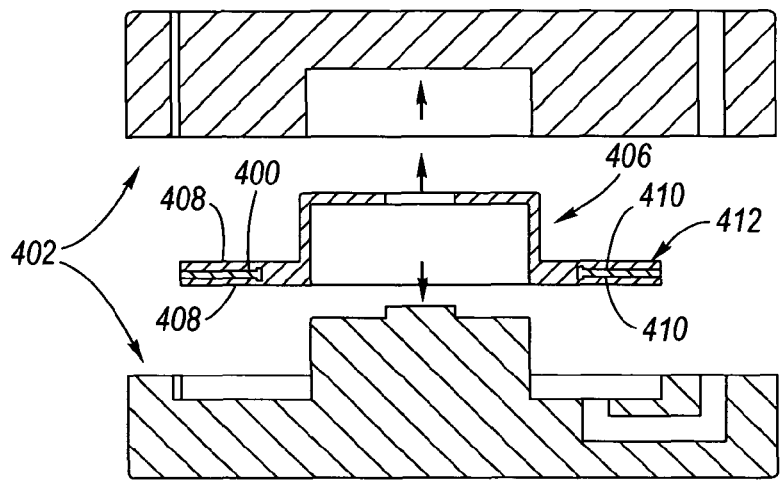
Figure 15F:
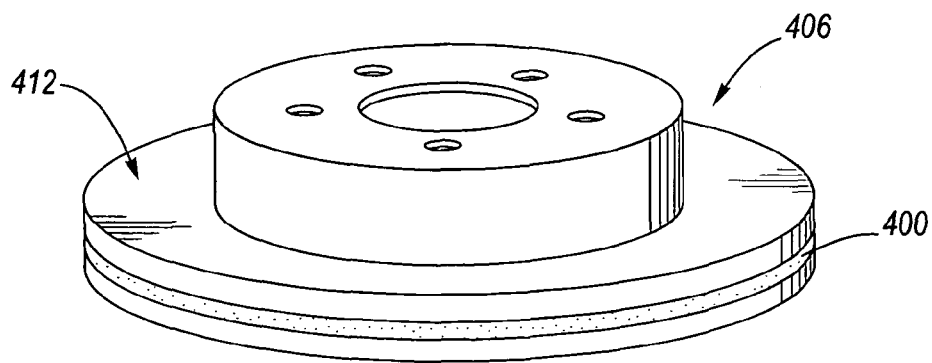
Figure 15G:
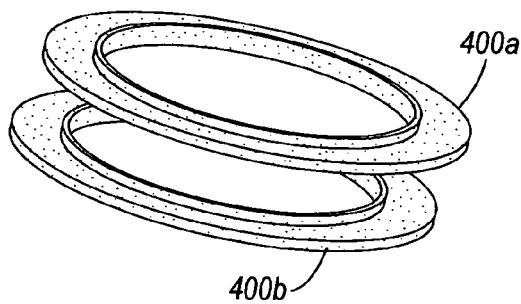
FIGS. 15G through 15M depict sequential views of a method of manufacture of a Coulomb friction damped disc brake rotor having a vented rotor cheek configuration, wherein a pair of inserts and a web pattern are pre-manufactured and the disc brake rotor is cast therearound.
Figure 15H:
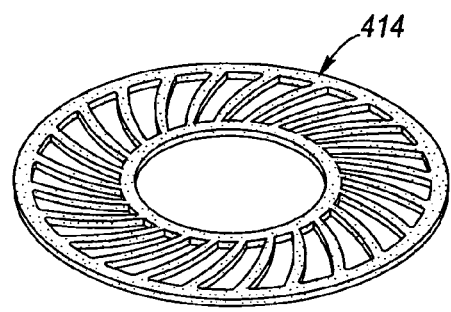
Figure 15I:
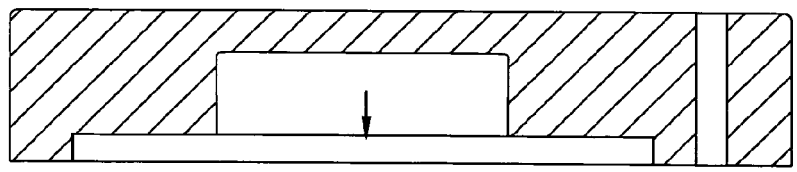
Figure 15I:
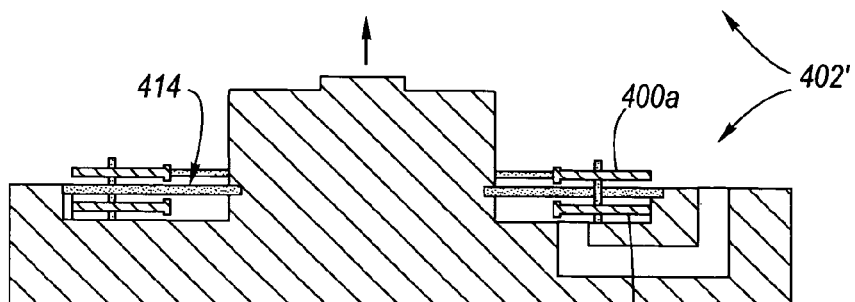
Figure 15J:
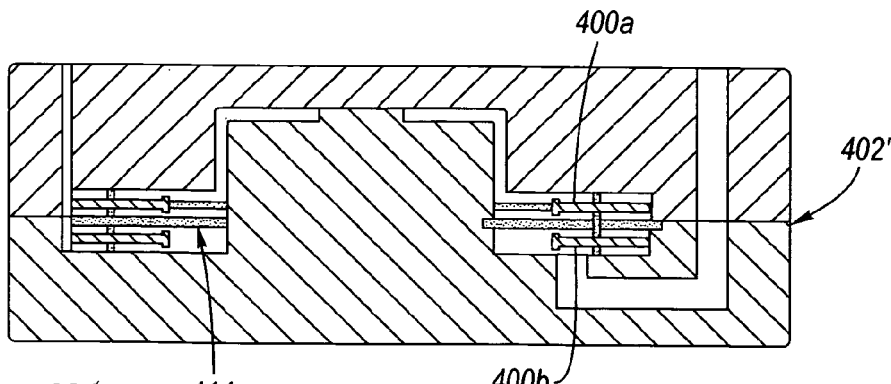
Figure 15K:
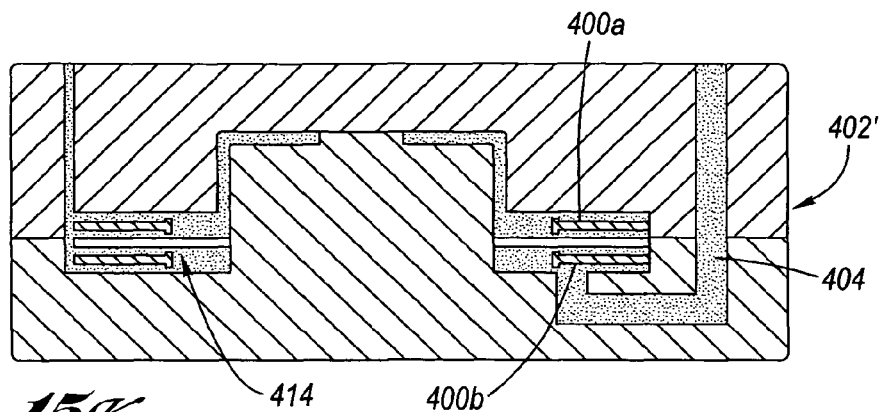
Figure 15L:
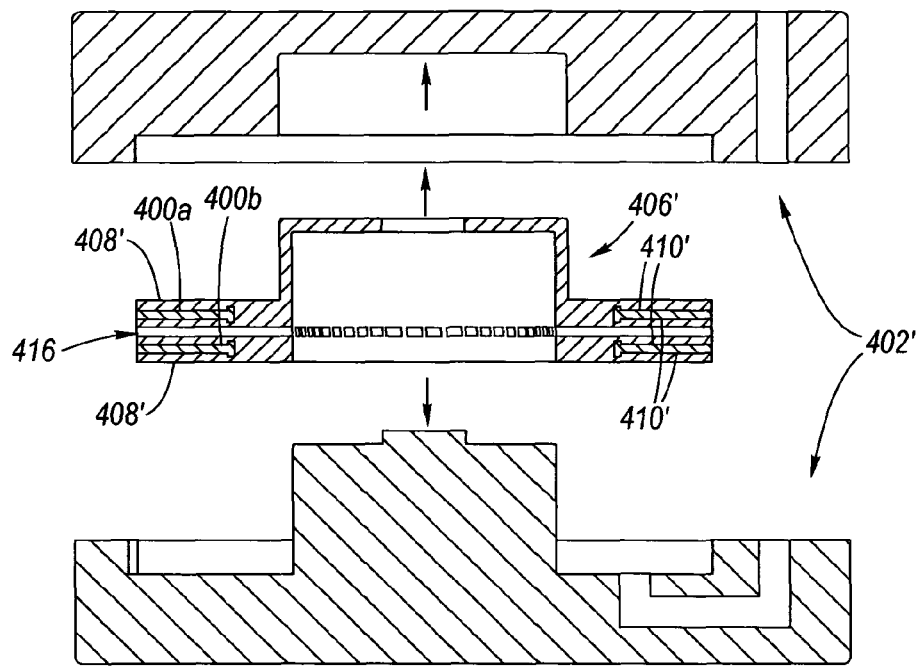
Figure 15M:
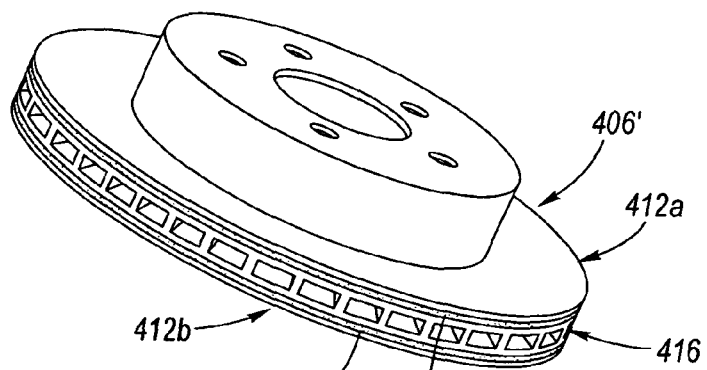

In FIGS. 15A through 15F, a disc brake rotor is molded by casting around a pre-manufactured insert 400 (see FIG. 15A). The insert 400 is placed into a mold 402 (see FIG. 15B) and becomes part of the mold package (see FIG. 15C). Molten metal 404 is then poured into the mold 402. The insert 400 may be, for example, metallic or may be a ceramic that could be reinforced. Once removed from the mold (see FIGS. 15E and 15F), a Coulomb friction damped disc brake rotor 406 having a solid rotor cheek configuration is provided, wherein the insert 400 is generally coextensive with the braking surfaces 408 of the rotor cheek 412 and provides a pair of interfacial boundaries 410. An advantage of this method of manufacture is that the insert 400 can be totally encapsulated within the rotor cheek 412, as for example depicted at FIG. 8. Further, the insert 400 may be sprayed with a coating or otherwise have its surface treated (e.g., shot peening or surface roughing) to optimize the seating thereof in the annular slot formed therearound by rotor cheek. More than one insert may be cast over by formation of the disk brake rotor.

FIGS. 15G through 15M depict sequential manufacturing steps as those described in FIGS. 15A through 15F, wherein now a vented rotor cheek configuration having two rotor cheeks 412*a*, 412*b* (see FIGS. 15L and 15M) is provided, wherein now primes denote similar functioning parts as those described above in FIGS. 15A through 15F. In this regard, a pre-manufactured sacrificial web pattern 414 is provided and is sandwiched in a mold 402' between two pre-manufactured inserts 400*a*, 400*b*. Molten metal 404' is poured into the mold 402', and the sacrificial web pattern serves to provide a vaned ventilation web 416 of the metal 404'. In each rotor cheek 412a, 412b of the manufactured Coulomb friction damped disc brake rotor 406', the inserts 400a, 400b are generally coextensive with the braking surfaces 408' and provide interfacial boundaries 318' so as to have damping therewith.

It is to be understood that any of the manufacturing methodologies described hereinabove can be readily adapted to provide multiple inserts in the rotor cheeks.

Further, it is to be noted that any of the manufacturing methodologies described hereinabove can be used for other articles which require noise damping.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for manufacturing a Coulomb friction damped disc brake rotor, comprising the steps of:
    providing at least one insert having a coating sprayed thereon; and
    forming a disc brake rotor in a mold comprising casting molten metal substantially surrounding the at least one insert, wherein a rotor cheek of the disc brake rotor is formed over the at least one insert so that the insert is embedded in the rotor cheek, wherein the rotor cheek has at least one braking surface, and wherein the at least one insert is substantially coextensive with the at least one braking surface;
    wherein the at least one insert and the rotor cheek provide at least two interfacial boundaries, each interfacial boundary defining an interstice between a rotor cheek inner surface and a surface of the insert and providing a mechanically distinguishable surface boundary between the rotor cheek inner surface and the surface of the insert which are in mutual contact such that a state of Coulomb friction exists therebetween.

2. The method of claim 1, wherein:
    said step of providing provides at least two inserts; and
    said step of forming forms a disc brake rotor having a vented cheek configuration comprising two rotor cheeks, wherein each of the two rotor cheeks is formed over at least one insert of the at least two inserts, respectively, and wherein each rotor cheek has a respective braking surface, and wherein the at least two inserts are substantially coextensive with the braking surfaces.

3. A method of manufacturing a coulomb friction damped disc brake rotor as set forth in claim 1, wherein the forming a disc brake rotor comprises surrounding at least three sides of the insert with the rotor cheek.

4. A method for manufacturing a damped article comprising the steps of:
    providing at least one insert; and
    forming the article, wherein the article is formed over the at least one insert so that the at least one insert is substantially surrounded and embedded in the article;
    wherein the at least one insert provides at least four interfacial boundaries, the interfacial boundaries providing a mechanically distinguishable surface boundary between two surfaces which are in mutual contact such that a state of Coulomb friction exists therebetween.

5. A method as set forth in claim 4 wherein the insert includes flat portion and a bulbous positioned to interferingly engage the rotor cheek.

6. A method comprising:
    providing at least one insert; and
    casting a disc brake rotor that comprises at least one substantially solid rotor cheek having at least one braking surface over the at least on insert so that the at least one insert is embedded in the rotor cheek and surrounded on at least five sides by the rotor cheek;
    wherein the at least one insert provides at least one interfacial boundary, the interfacial boundary providing a mechanically distinguishable surface boundary between two surfaces which are in mutual contact such that a state of Coulomb friction exists therebetween.

7. A method as set forth in claim 6, wherein the at least one insert is substantially coextensive with the at least one braking surface of the rotor cheek.

8. A method for manufacturing a damped article comprising the steps of:
    providing at least one insert; and
    forming the article, wherein the article is formed over the at least one insert so that the at least one insert is substantially surrounded and embedded in the article;
    wherein the at least one insert provides at least three interfacial boundaries, the interfacial boundaries providing a mechanically distinguishable surface boundary between two surfaces which are in mutual contact such that a state of Coulomb friction exists therebetween.

9. A method as set forth in claim 8, wherein the article comprises a brake rotor having at least one braking surface and wherein the at least one insert is substantially coextensive with the at least one braking surface of the rotor cheek.

10. A method as set forth in claim 8 wherein the insert includes a bulbous positioned to interferingly engage the rotor cheek.

11. A method comprising:
    providing at least one insert; and
    casting a disc brake rotor that comprises at least one substantially solid rotor cheek having at least one braking surface over the at least one insert so that the at least one insert is embedded in the rotor cheek and surrounded on at least five sides by the rotor cheek;
    wherein the at least one insert provides at least one interfacial boundary, the interfacial boundary providing a mechanically distinguishable surface boundary between two surfaces which are in mutual contact such that a state of Coulomb friction exists therebetween.

12. A method comprising:
    providing at least one insert; and
    placing the at least one insert in a casting mold half and supporting the at least one insert in the mold half by at least one post or chaplet;
    casting a disc brake rotor that comprises at least one substantially solid rotor cheek having at least one braking surface over the at least one insert, and wherein the insert includes an upper face, a lower face and an inner radial side connecting the upper face and lower face, and so that the at least one insert is embedded in the rotor cheek and surrounded on the upper face, the lower face and the inner radial side by the rotor cheek;
    wherein the at least one insert provides at least one interfacial boundary, the interfacial boundary providing a mechanically distinguishable surface boundary between two surfaces which are in mutual contact such that a state of Coulomb friction exists therebetween.

13. A method as set forth in claim 12, wherein the at least one insert is substantially coextensive with the at least one braking surface of the rotor cheek.

14. A method as set forth in claim 12 wherein the insert includes a bulbous positioned to interferingly engage the rotor cheek.

* * * * *